US009413177B2

(12) United States Patent
Lim et al.

(10) Patent No.: US 9,413,177 B2
(45) Date of Patent: Aug. 9, 2016

(54) EFFICIENT APPARATUS AND METHOD FOR INHIBITING CORROSION WITH DISCHARGE BLOCKING FEATURES IN A BATTERY

(71) Applicant: MOTOROLA SOLUTIONS, INC, Schaumburg, IL (US)

(72) Inventors: Soon Heng Lim, Pulau Pinang (MY); Kow Chee Chong, Penang (MY); Premchand K Surya Narayanan, Bayan Lepas (MY); Macwien Krishnamurthi, Shah Alam (MY); Zanariah Mat Nor, Terengganu (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 149 days.

(21) Appl. No.: 14/533,558

(22) Filed: Nov. 5, 2014

(65) Prior Publication Data

US 2016/0126764 A1 May 5, 2016

(51) Int. Cl.
*H02J 7/00* (2006.01)

(52) U.S. Cl.
CPC .................... *H02J 7/0013* (2013.01)

(58) Field of Classification Search
CPC ...... H02J 7/0011; H02J 7/0013; H02J 7/0052
USPC .......... 320/106–107, 112, 118, 127–128, 135
See application file for complete search history.

(56) References Cited

U.S. PATENT DOCUMENTS

| 5,471,128 | A | 11/1995 | Patino et al. |
| 5,477,124 | A * | 12/1995 | Tamai ............... H01M 10/44 320/135 |
| 6,087,803 | A * | 7/2000 | Eguchi ............... G06F 1/26 320/106 |
| 6,498,459 | B1 * | 12/2002 | Okumura ............ H02J 7/0068 320/127 |
| 7,725,138 | B2 | 5/2010 | Herrera |
| 8,421,418 | B2 | 4/2013 | Kumarshiro et al. |
| 8,643,337 | B2 | 2/2014 | Kwong et al. |

FOREIGN PATENT DOCUMENTS

EP 2022155 B1 8/2012

* cited by examiner

*Primary Examiner* — Paul Dinh (57) ABSTRACT

A battery pack selectively coupled to a portable electronic device and/or a recharging source, and configured to inhibit corrosion with discharge blocking features, the battery pack includes a positive terminal, a negative terminal, and a data terminal accessible from a housing of the battery pack, wherein each of the positive terminal, the negative terminal, and the data terminal are coupled to a battery in the battery pack; and a discharge blocking circuit configured to allow/block voltage across the positive terminal and the negative terminal based on a presence of a steady state pull up on the data terminal, wherein the steady state pull up is based on the battery pack being coupled to the recharging source, via the positive terminal, the negative terminal, and the data terminal.

20 Claims, 8 Drawing Sheets

EFFICIENT APPARATUS AND METHOD FOR INHIBITING CORROSION WITH DISCHARGE BLOCKING FEATURES IN A BATTERY

BACKGROUND OF THE INVENTION

For battery packs in mobile devices, radios, etc., a discharge blocking circuit is a necessary feature for batteries with exposed rear charging-interface terminals. The discharge blocking circuit is configured to inhibit the presence of cell voltage from appearing across the rear terminals as well as to improve battery charging efficiency by eliminating heat dissipation and reducing voltage drop from the charger to the battery pack's cells. The discharge blocking circuit is further coupled to the battery pack's Thermistor terminal. A presence of potential difference at the rear charging-interface terminals, when exposed to ionic/conductive vapor, can accelerate the corrosion process (by electrolysis), such as when subjected to salt fog test conditions. As consumer demand for lighter radio increases, magnesium alloy, known for its lightweight properties, is being introduced, replacing its heavier predecessor, aluminum alloy, as the base material for a radio chassis. In a typical radio construction, a battery is firmly attached to the radio rear chassis. The rear charging-interface terminals of batteries are made of nickel alloy material for low surface resistance, while the radio rear chassis is of magnesium alloy. The anodic index for magnesium alloy is −1.75V, whereas the anodic index for nickel alloy is −0.35V. When both metals are electrically connected via an electrolyte, a potential difference of 1.4V forms at the nickel alloy terminals with respect to the magnesium alloy chassis.

In conventional discharge blocking circuit designs, a voltage as low as 0.5V on a thermistor rear charging-interface terminal, is sufficient to disable the discharge blocking feature, hence presenting the full cell voltage appearing across the positive charge (CH+) and negative charge (CH−) terminals, which further latches the thermistor line to high, facilitating a strong electrolysis process in an ionic/salt solution accelerating corrosion on one of the terminals. To merely change the triggering threshold from 0.5V to higher voltages, in conventional discharge blocking circuits, will inhibit the functionality of the discharge blocking circuit when at high temperatures, due to lower impedance of the thermistor (negative temperature coefficient (NTC) device) when hot. To relocate the triggering rear charging-interface terminal, for the discharge blocking circuit, in this case the thermistor rear charging-interface terminal, away from the magnesium alloy chassis has been futile as well as impacting battery miniaturization, charger pocket design and the like.

Accordingly, there is a need for an efficient apparatus and method for inhibiting corrosion with discharge blocking features in a battery.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a battery pack selectively coupled to a portable electronic device and/or a recharging source, and configured to inhibit corrosion with discharge blocking features, the battery pack includes a positive terminal, a negative terminal, and a data terminal accessible from a housing of the battery pack, wherein each of the positive terminal, the negative terminal, and the data terminal are coupled to a battery in the battery pack; and a discharge blocking circuit configured to allow/block voltage across the positive terminal and the negative terminal based on a presence of a steady state pull up on the data terminal, wherein the steady state pull up is based on the battery pack being coupled to the recharging source, via the positive terminal, the negative terminal, and the data terminal.

In another exemplary embodiment, a portable electronic device configured to inhibit corrosion with discharge blocking features includes a removable battery pack with a positive terminal, a negative terminal, and a data terminal accessible from a housing of the battery pack, wherein each of the positive terminal, the negative terminal, and the data terminal are coupled to a battery in the battery pack; and a discharge blocking circuit configured to allow/block voltage across the positive terminal and the negative terminal based on a presence of a steady state pull up on the data terminal, wherein the steady state pull up is based on the battery pack being coupled to a recharging source.

In a further exemplary embodiment, a method in a battery pack selectively coupled to a portable electronic device to inhibit corrosion with discharge blocking features, wherein the battery pack comprise a positive terminal, a negative terminal, and a data terminal accessible from a housing of the battery pack, the method includes operating a discharge blocking circuit in the battery pack, wherein the discharge block circuit is coupled to the data terminal and one of the positive terminal and the negative terminal; blocking voltage by the discharge blocking circuit across the positive terminal and the negative terminal based on no steady state pull up on the data terminal; and allowing voltage by the discharge blocking circuit across the positive terminal and the negative terminal based on steady state pull up on the data terminal, wherein the steady state pull up is based on the battery pack being coupled to a recharging source.

In various exemplary embodiments, an efficient apparatus and method is described for inhibiting corrosion as well as to provide with the efficient charging and discharge blocking features during the battery pack's charging and discharging processes. An exemplary objective of the apparatus and methods is to provide a robust control of a discharge blocking mechanism, which is immune to lower level stray voltages with reference to the absolute ground, and that can only be triggered when the battery is securely docked in a compatible charger. The apparatus and method includes decoupling present control of the discharge blocking mechanism from a voltage-sensitive, analog thermistor terminal and configuring it to a solid-state, data terminal. The operation of data terminal, being solid state in nature, provides the opportunity and flexibility to increase the gate-source threshold of an N-Channel Field Effect Transistor (FET) switch, making it immune to stray voltage; for example, in this case, the electrochemical voltage of 1.4V formed from a galvanic reaction between magnesium and nickel alloys in the presence of a salt electrolyte.

Advantageously, the apparatus and method enable use of a different material and composition for host chassis of the battery, thereby inhibiting corrosion activity as well as performing the discharge blocking function, by electronic means.

Figure 1:
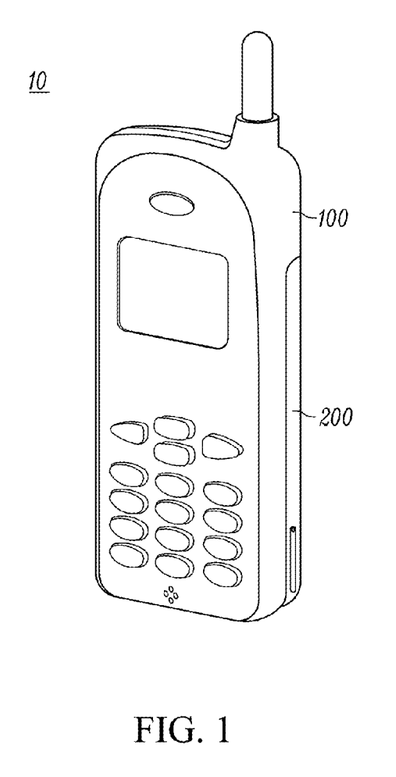
FIG. 1 is a perspective diagram of a battery operated portable electronic device in accordance with some embodiments.
Figure 2:
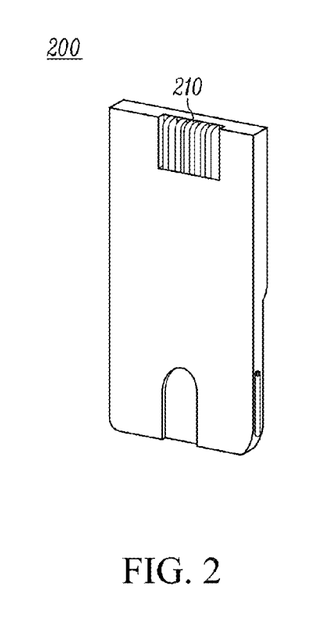
FIG. 2 is a perspective diagram of a removable battery, removed from the battery operated portable electronic device and showing internal battery pack terminals, in accordance with some embodiments.
Figure 3:
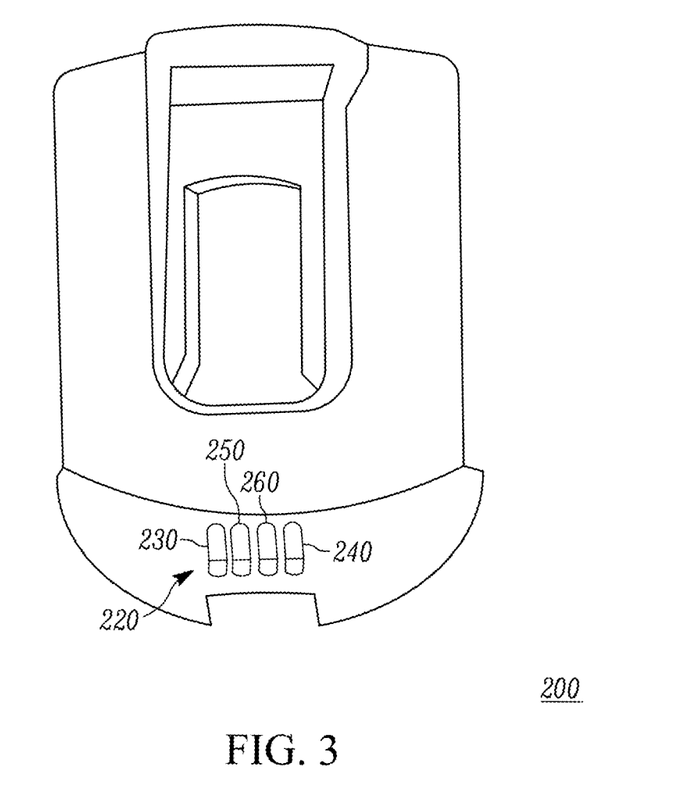
FIG. 3 is a perspective diagram of another removable battery, removed from the battery operated portable electronic device and showing external battery pack terminals, in accordance with some embodiments.

FIG. 1 is a perspective diagram of a battery operated portable electronic device 10 in accordance with some embodiments. FIG. 2 is a perspective diagram of a removable battery pack 200, removed from the battery operated portable electronic device 10 and showing internal battery pack terminals 210, in accordance with some embodiments. FIG. 3 is a perspective diagram of another removable battery pack 200, removed from the battery operated portable electronic device 10 and showing external battery pack terminals 220, in accordance with some embodiments.

The portable electronic device 10 may include, for example, a portable radio, a portable computer, a smart phone, or any other transportable host device powered from a rechargeable battery. For the purposes of the foregoing descriptions, the battery operated portable electronic device 10 is described in terms of a portable radio 100 having electronics enclosed therein and a battery pack 200 having battery electronics enclosed therein. Of course, those of ordinary skill in the art will recognize the apparatus and method described herein can apply to any implementation of the battery operated portable electronic device 10.

The battery pack 200 is removably coupled to the radio 100. A plurality of internal battery pack terminals 210 provides electrical contact with corresponding radio contacts of the portable radio 100 (not shown). Also, a plurality of external battery pack terminals 220 provide electrical contact with corresponding contacts in a charger or docking station (not shown).

In an exemplary embodiment, the plurality of external battery pack terminals 220 include a negative charge (CH−) terminal 230, a positive charge (CH+) terminal 240, a thermal terminal 250, and a data terminal 260. The CH− terminal 230 and the CH+ terminal 240 are configured to connect the battery to a recharging source. Note, the recharging source can be a dock, a cradle, a plug, or the like that is configured to connect to the battery pack 200. The thermal terminal 250 is a thermistor terminal measuring temperature of the battery, and the data terminal 260 provides data connectivity from the charging source to the battery. Note, the terminals 230, 240, 250, 260 are exposed on a rear portion of the battery pack 200 allowing the battery pack 200 and/or the radio 100 with the battery pack 200 coupled thereto to connect to the recharging source.

In an exemplary embodiment, a chassis associated with the radio 100 includes magnesium alloy, and the terminals 230, 240, 250, 260 are made of a nickel alloy material for low surface resistance. As described herein, the anodic index for magnesium alloy is −1.75V, whereas that of Nickel alloy is −0.35V. When both metals are electrically connected via an electrolyte, a potential difference of 1.4V forms at nickel alloy terminals 230, 240, 250, 260 with respect to the magnesium alloy chassis of the radio.

Figure 4:
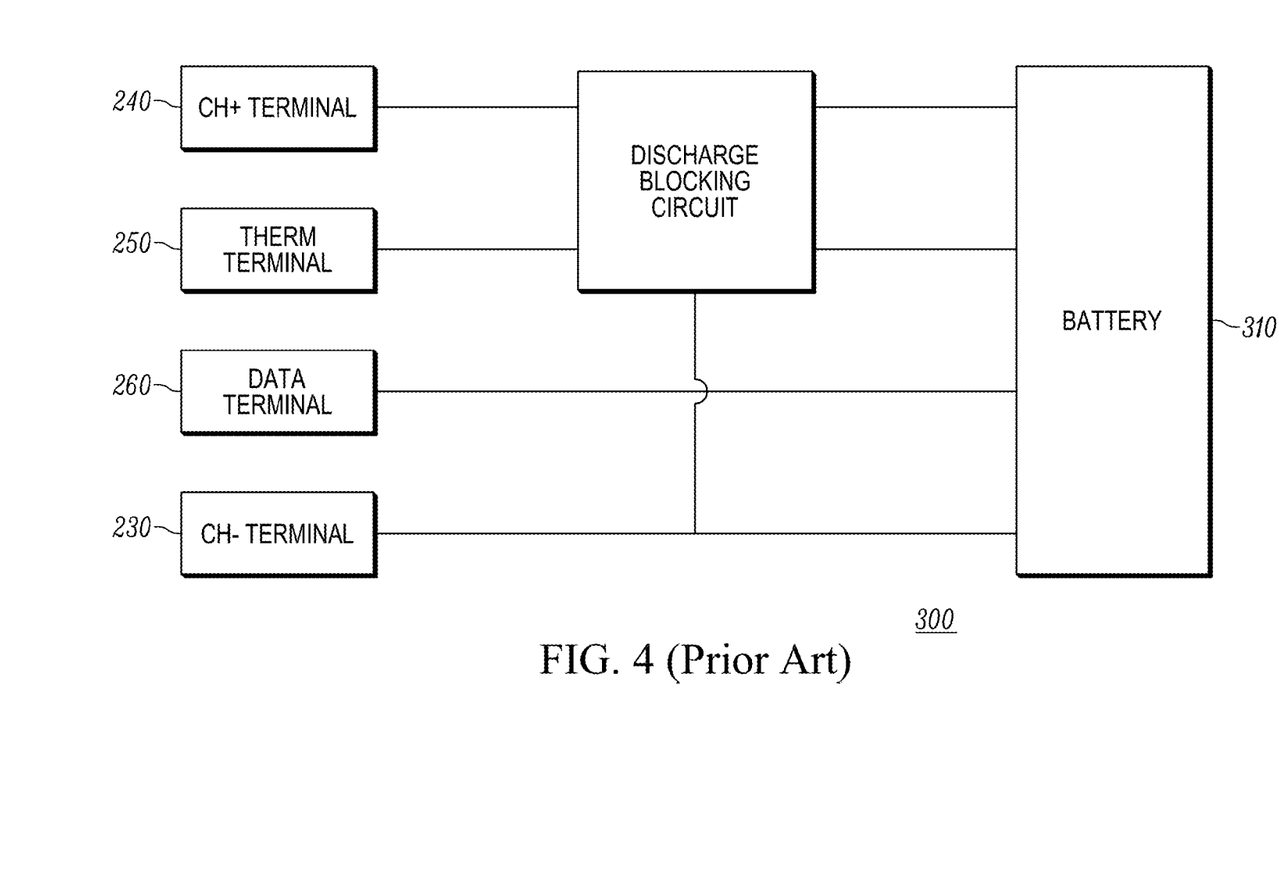
FIG. 4 is a block diagram of circuit connectivity between the external battery pack terminals and a battery in accordance with some conventional embodiments.

FIG. 4 is a block diagram of circuit connectivity 300 between the terminals 230, 240, 250, 260 and a battery 310 in accordance with some conventional embodiments. The circuit connectivity 300 includes a discharge blocking circuit 320. The discharge blocking circuit 320 is configured to prevent voltages appearing across the CH− terminal 230 and the CH+ terminal 240 except when the battery pack 200 is coupled or engaged to the recharging source. In present discharge blocking circuit designs, such as the discharge blocking circuit 320, a voltage as low as 0.5V on thermal terminal 250, is sufficient to disable the discharge blocking feature of the discharge blocking circuit 320, hence presenting a full cell voltage appearing across the CH− terminal 230 and the CH+ terminal 240, which further latches the thermal terminal 250 line to high, facilitating a strong electrolysis process in an ionic/salt solution accelerating corrosion on one of the terminals.

Figure 5:
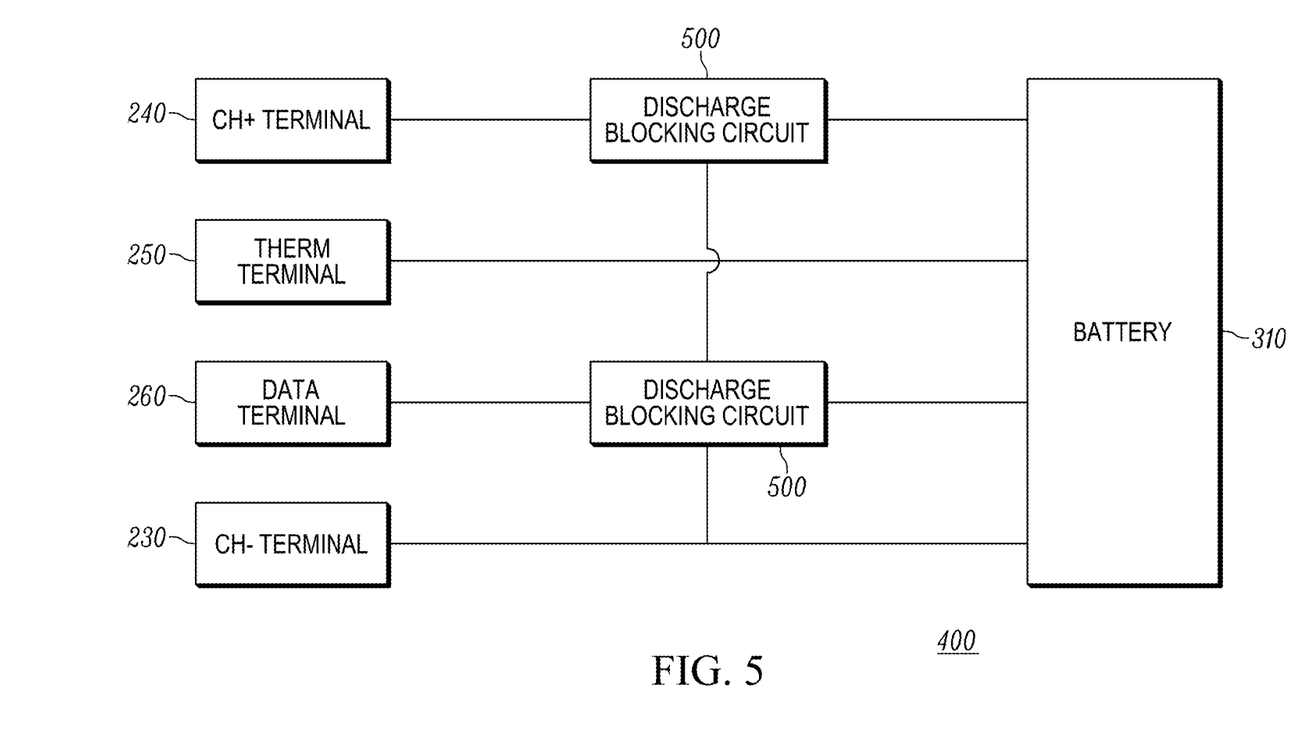
FIG. 5 is a block diagram of circuit connectivity between the between the terminals and a battery, overcoming the limitations in FIG. 4, in accordance with some embodiments.

FIG. 5 is a block diagram of circuit connectivity 400 between the between the terminals 230, 240, 250, 260 and a battery 310, overcoming the limitations in FIG. 4, in accordance with some embodiments. Specifically, the circuit connectivity 400 includes a discharge blocking circuit 500 between the data terminals 260 and the CH+ terminal 240. The circuit connectivity 400 provides a robust mechanism to control a discharge blocking switch, with immunity to lower level stray voltages, as is the case in FIG. 4, and that can only be triggered when the battery 310 is securely docked in a compatible recharging source.

Specifically, the thermal terminal 250 presents a variable voltage, temperatures and dynamic range of the underlying thermistor circuit connected to the thermal terminal 250. As discussed herein, this use of the thermal terminal 250 as the trigger for the discharge blocking circuit 320 is difficult when moving to magnesium alloy materials or other reactive alloy compositions, when the radio 100 is deployed in various conditions since there is a high likelihood of disabling the discharge blocking circuit 320 without having the battery pack 200 in the recharging source.

The data terminal 260, on the other hand, does not have variable voltages. Specifically, the data terminal 260 is activated in a compatible recharging source to provide data connectivity from the recharging source to the battery 310. The data terminal 260 will have only two voltage states—low (e.g., 0V, absolute low reference) and high (e.g., 3.3V, 5V, etc.). Thus, the circuit connectivity 400 removes the variability associated with the thermal terminal 250 from the discharge blocking feature of the discharge blocking circuit 500. The circuit connectivity 400 only allows voltages across the CH− terminal 230 and the CH+ terminal 240 when battery 310 is in the recharging source based on recognition of the data terminal 260. That is, the discharge blocking circuit 500 is activated/deactivated by a steady-state pull up on the data terminal 260 upon docking into a recharging source.

The discharge blocking circuit 500 keeps the battery 310 from being turned on when the external terminals 230, 240, 250, 260 are exposed to a conductive medium that sustains a voltage greater than 0.5V or 1V. This can occur in a galvanic cell when the materials have a large enough potential difference, in this case magnesium at −1.75V and nickel at −0.35V creating a delta of approximately 1.4V. The present protection circuit in FIG. 4 allows power to be turned on when a galvanic cell greater than 0.5V is present. The discharge blocking circuit 500 will not turn on power to the external terminals 230, 240, 250, 260 unless the voltage has a magnitude greater than 1.5V, i.e. a significant potential difference, which based on testing will not occur when subjected to a conductive medium. The discharge blocking circuit 500 was tested by submerging batteries in salt water and compared to the prior art protection circuit connectivity 300, and there was a marked reduction in corrosion on the battery with the new circuit.

In an exemplary embodiment, a battery pack 200 selectively coupled to a portable electronic device 10 and configured to inhibit corrosion with discharge blocking features includes a positive terminal 240, a negative terminal 230, and a data terminal 260 accessible from a housing of the battery pack 200, wherein each of the positive terminal 240, the negative terminal 230, and the data terminal 260 are coupled to a battery 310 in the battery pack 200; and a discharge blocking circuit 500 configured to allow/block voltage across the positive terminal 240 and the negative terminal 230 based on a presence of a steady state pull up on the data terminal 260, wherein the steady state pull up is based on the battery pack 200 being coupled to a recharging source. A potential difference between the positive terminal 240 and the negative terminal 230 can be greater than 1V due to associated anodic indices of materials used for the portable electronic device 10 and the battery pack 200.

The portable electronic device 10 can have a magnesium alloy chassis, and the positive terminal 240, the negative terminal 230, and the data terminal 260 can utilize nickel alloy. The discharge blocking circuit 500 can be coupled between the positive terminal 240 and the data terminal 260. The discharge blocking circuit 500 is immune to low level stray voltages associated with the positive terminal 240, the negative terminal 230, and the data terminal 260, only allowing discharge based on the steady state pull up of the data terminal 260. The battery pack 200 is configured for full immersion in salt water with the discharge blocking circuit 500 configured to protect against electrolytic corrosion on the positive terminal 240, the negative terminal 230, and the data terminal 260.

The discharge blocking circuit 500 is configured to turn on only responsive to a high voltage on the data terminal 260 with a magnitude greater than 1.5V and a time constant greater than 26 ms in order to sustain effects of data transmission between the battery pack and the Charging Source. The discharge blocking circuit 500 can include a high $V_{GS}$ Field Effect Transistor (FET) between the data terminal 260 and the positive terminal 240 that is active only when the data terminal 260 has a steady state voltage thereon. The battery pack is selectively insertable in the recharging source whether the battery pack 200 is coupled or decoupled from the portable electronic device 10.

Figure 6:
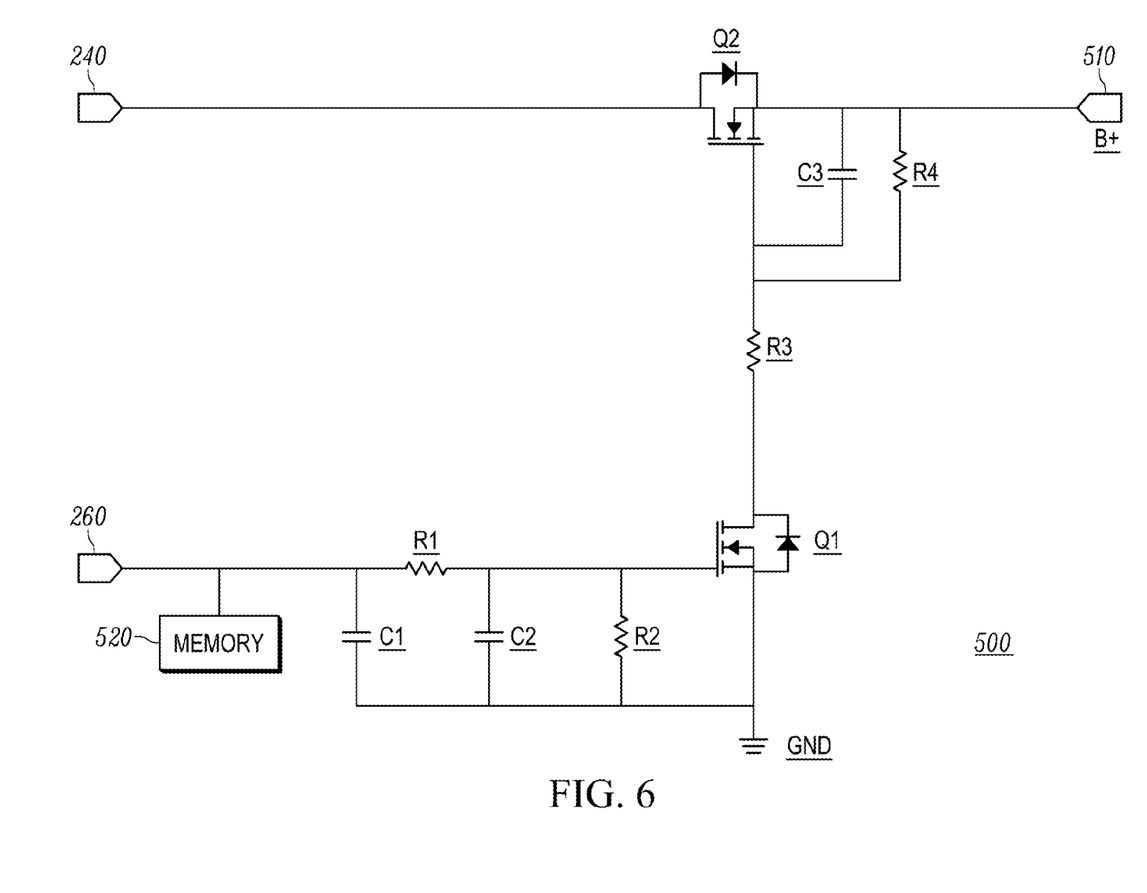
FIG. 6 is a circuit diagram of the discharge blocking circuit included in FIG. 5 in accordance with some embodiments.

FIG. 6 is a circuit diagram of the discharge blocking circuit 500 in accordance with some embodiments. FIG. 6 illustrates the various components of the discharge blocking circuit 500 which connect to the CH+ terminal 240 and the data terminal 260. The discharge blocking circuit 500 is configured to prevent connections between the CH+ terminal 240 and a battery terminal 510 in the battery 310, when not equipped in the recharging source.

The data terminal 260 can connect to a memory 520. The memory 520 can be an Electrically Programmable Read-Only Memory (EPROM) or erasable memory Integrated Circuit (IC), but other suitable memory may be used. The memory 520 is located in the battery pack 200 and is coupled to the data terminal 260. The memory 520 is configured to receive, from the charger, and store data from the data communication terminal 260. In an exemplary embodiment, the memory 520 can provide a high voltage to the discharge blocking circuit 500 when the battery pack 200 is coupled and controlled to and by the recharging source between the recharging source's microprocessor and the battery packs EPROM/EEPROM; this being the only time, during the battery recharging process, the discharge blocking circuit 500 disables discharge blocking between the terminals 240, 510.

In an exemplary embodiment, the discharge blocking circuit 500 includes the following components and values, but it is understood that the component values may be selected based on the current and voltage requirements for a specific application:

| Component | Description |
|---|---|
| C1 | 5% 100 pF |
| R1 | 5% 100 kΩ |
| C2 | 5% 100 pF |
| R2 | 5% 1 MΩ |
| Q1 | NTR5198NL: Power MOSFET 60 V 2.2 A 155 mΩ Single N-Channel SOT-23 |
| R3 | 5% 100 kΩ |
| C3 | 5% 100 pF |
| R4 | 5% 270 kΩ |
| Q2 | SI4403CDY MOSFET, P CH, W/D, 20 V, 13.4 A, SO8 |

Figure 7:
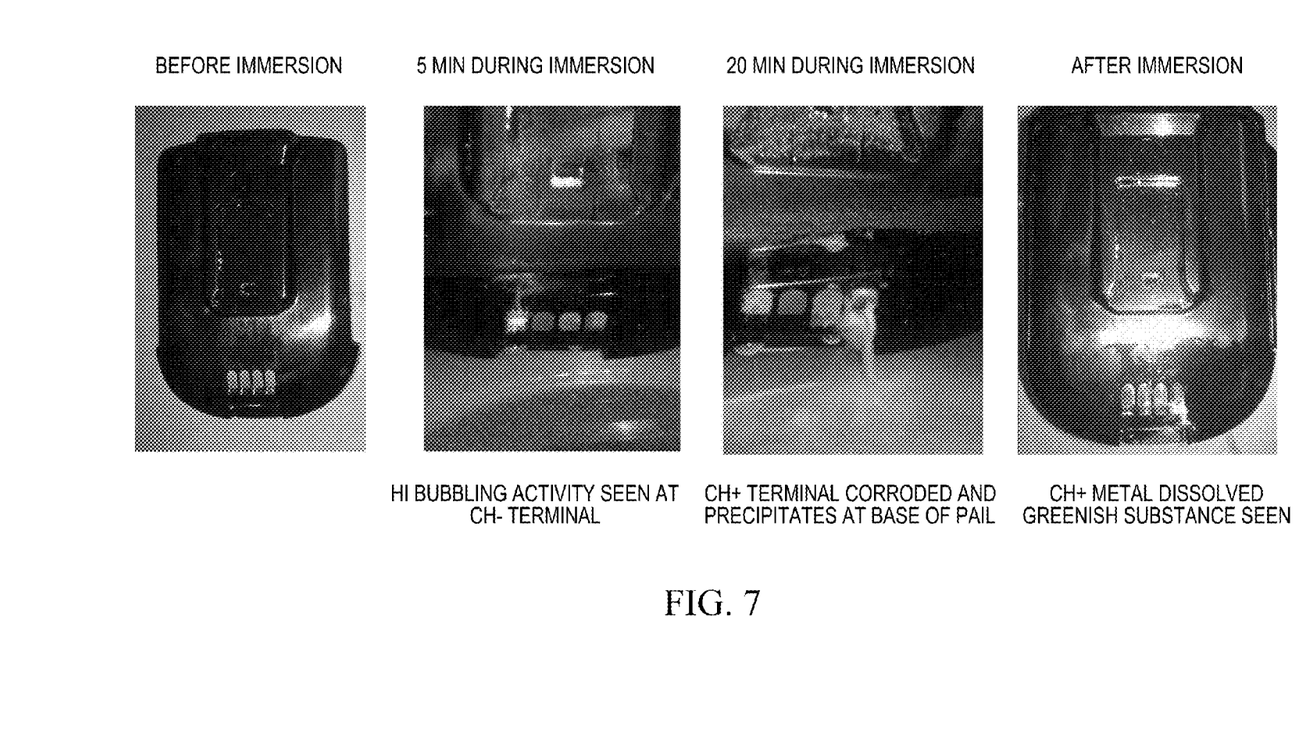
FIG. 7 is various views of a battery pack, with the circuit connectivity in FIG. 4, showing various stages after immersion in concentrated salt water.
Figure 8:
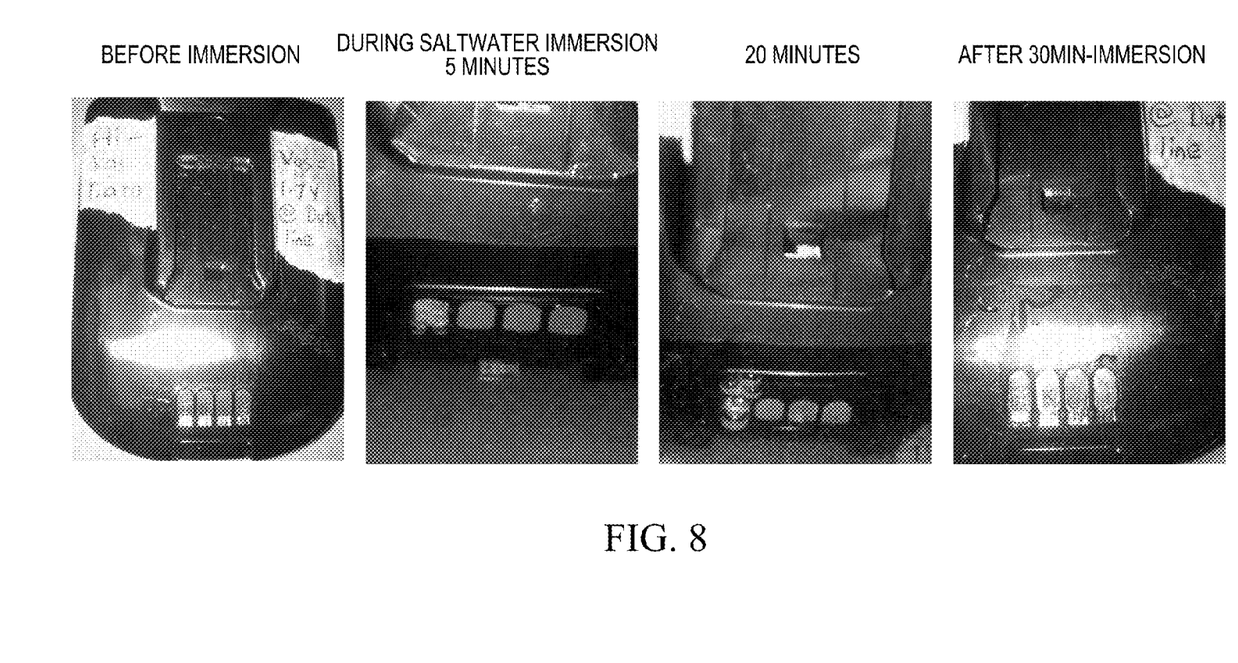
FIG. 8 is various views of a battery pack, with the circuit connectivity in FIG. 5 and the associated discharge blocking circuit of FIG. 6, showing various stages after immersion in concentrated salt water.

FIG. 7 is various views of a battery pack, with the circuit connectivity 300 in FIG. 4, showing various stages after immersion in concentrated salt water. FIG. 8 is various views of a battery pack, with the circuit connectivity 400 in FIG. 5 and the associated discharge blocking circuit 500, showing various stages after immersion in concentrated salt water. Specifically, the radio 100 and the battery pack 200 are expected to work under harsh field and environmental conditions, including full submersion such as in the ocean. FIGS. 7 and 8 illustrate exemplary results from an immersion test in concentrated salt water (50 g salt to 1 liter water). As is shown in FIG. 7, after 5 min. of immersion, bubbling activity is seen on the CH− terminal, after 20 min. of immersion, the CH+ terminal is corroded and precipitates at a base of a pail, and after immersion, the CH+ terminal metal is dissolved and a greenish substance is observed instead. Conversely, FIG. 8 shows the circuit connectivity 400 prevents corrosion and the terminals are not dissolved after 30 min. of immersion.

Additionally, various other tests were performed including discharge capacity, RFI (spray test), transmit instability (Ground plane test), and Electro Static Discharge (ESD). All evaluations showed that the proposed circuit, can indeed be used as an electronic mechanisms to enable/disable the discharge blocking circuitry and provide increased voltage floor relative to the absolute ground in order to negate the electrochemical voltage that would otherwise facilitate corrosion. Thus, the circuit connectivity 400 and the associated discharge blocking circuit 500 securely protects terminals from electrolytic corrosion, even when immersed in a salt water concentration.

Further, the circuit connectivity 400 require no additional dedicated terminals, in the battery pack 200, required for the operation, thus saving redesign and costs in the radio 100. The data line from the data terminal 260 provides a larger useable voltage margin, and it does not interfere with temperature scaling and range as would otherwise be seen when using the thermistor line. Advantageously, the circuit connectivity 400 allows flexibility to use different materials and alloys for radio chassis relative to the terminals. For example, a potential difference between the positive terminal and the negative terminal can be greater than 1V due to associated anodic indices of materials used for the portable electronic device 10 and the battery pack 200. As described and demonstrated, the apparatus and method makes a significant difference in the performance of the battery contacts when used in conjunction with a magnesium chassis.

Figure 9:
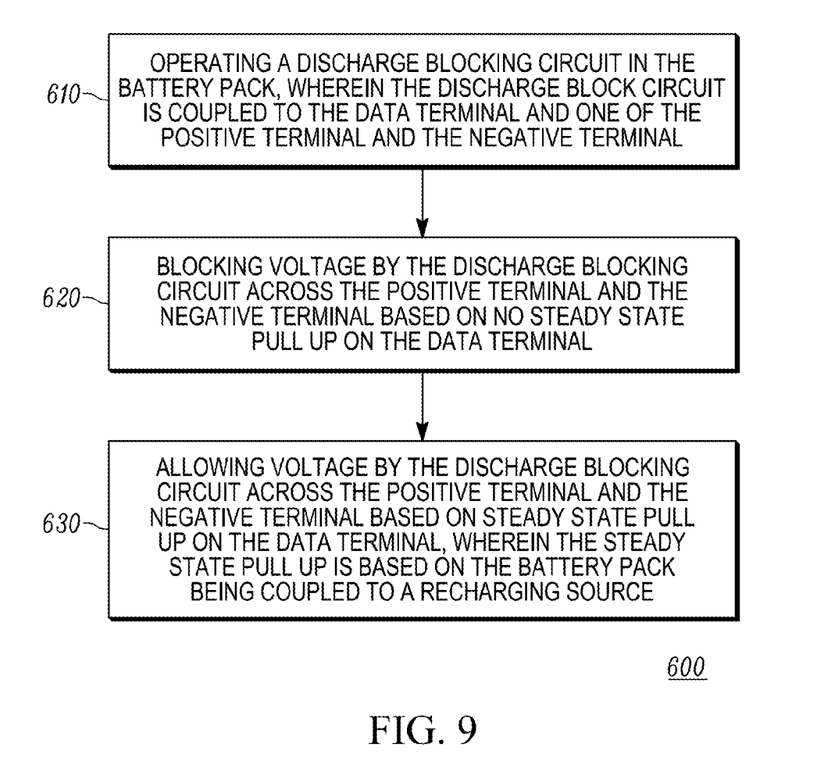
FIG. 9 is a flow chart of a process in a battery pack selectively coupled to a portable electronic device to inhibit corrosion with discharge blocking features.

FIG. 9 is a flow chart of a process 600 in a battery pack selectively coupled to a portable electronic device to inhibit corrosion with discharge blocking features. The battery pack comprises a positive terminal, a negative terminal, and a data terminal accessible from a housing of the battery pack. The process 600 includes operating a discharge blocking circuit in the battery pack, wherein the discharge block circuit is coupled to the data terminal and one of the positive terminal and the negative terminal (step 610), blocking voltage by the discharge blocking circuit across the positive terminal and the negative terminal based on no steady state pull up on the data terminal (step 620), and allowing voltage by the discharge blocking circuit across the positive terminal and the negative terminal based on steady state pull up on the data terminal, wherein the steady state pull up is based on the battery pack being coupled to a recharging source (step 630).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Electrically Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery pack selectively coupled to a portable electronic device and/or a recharging source, and configured to inhibit corrosion with discharge blocking features, the battery pack comprising:
   a positive terminal, a negative terminal, and a data terminal accessible from a housing of the battery pack, wherein each of the positive terminal, the negative terminal, and the data terminal are coupled to a battery in the battery pack; and
   a discharge blocking circuit configured to allow/block voltage across the positive terminal and the negative terminal based on a presence of a steady state pull up on the data terminal, wherein the steady state pull up is based on the battery pack being coupled to the recharging source, via the positive terminal, the negative terminal, and the data terminal.

2. The battery pack of claim 1, wherein a potential difference between the positive terminal and the negative terminal is greater than 1V due to associated anodic indices of materials used for the portable electronic device and the battery pack.

3. The battery pack of claim 1, wherein the portable electronic device has a magnesium alloy chassis, and wherein the positive terminal, the negative terminal, and the data terminal utilize nickel alloy.

4. The battery pack of claim 1, wherein the discharge blocking circuit is coupled between the positive terminal and the data terminal.

5. The battery pack of claim 1, wherein the discharge blocking circuit is immune to low level stray voltages associated with the positive terminal, the negative terminal, and the data terminal, only allowing discharge based on the steady state pull up of the data terminal.

6. The battery pack of claim 1, wherein the battery pack is configured for full immersion in salt water with the discharge blocking circuit configured to protect against electrolytic corrosion on the positive terminal, the negative terminal, and the data terminal.

7. The battery pack of claim 1, wherein the discharge blocking circuit is configured to turn on only responsive to a high voltage on the data terminal with a magnitude greater than 1.5V.

8. The battery pack of claim 1, wherein the discharge blocking circuit comprises a high $V_{GS}$ Field Effect Transistor (FET) between the data terminal and the positive terminal that is active only when the data terminal has a steady state voltage thereon.

9. The battery pack of claim 1, wherein the battery pack is selectively insertable in the recharging source whether the battery pack is coupled or decoupled from the portable electronic device.

10. A portable electronic device configured to inhibit corrosion with discharge blocking features, the portable electronic device comprising:
    a removable battery pack with a positive terminal, a negative terminal, and a data terminal accessible from a housing of the battery pack, wherein each of the positive terminal, the negative terminal, and the data terminal are coupled to a battery in the battery pack; and
    a discharge blocking circuit configured to allow/block voltage across the positive terminal and the negative terminal based on a presence of a steady state pull up on the data terminal, wherein the steady state pull up is based on the battery pack being coupled to a recharging source.

11. The portable electronic device of claim 10, wherein a potential difference between the positive terminal and the negative terminal is greater than 1V due to associated anodic indices of materials used for the portable electronic device and the battery pack.

12. The portable electronic device of claim 10, wherein the portable electronic device has a magnesium alloy chassis, and wherein the positive terminal, the negative terminal, and the data terminal utilize nickel alloy, and wherein a significant potential difference is formed due to the difference in anodic indices of materials.

13. The portable electronic device of claim 10, wherein the discharge blocking circuit is coupled between the positive terminal and the data terminal.

14. The portable electronic device of claim 10, wherein the discharge blocking circuit is immune to low level stray voltages associated with the positive terminal, the negative terminal, and the data terminal, only allowing discharge based on the steady state pull up of the data terminal.

15. The portable electronic device of claim 10, wherein the battery pack is configured for full immersion in salt water with the discharge blocking circuit configured to protect against electrolytic corrosion on the positive terminal, the negative terminal, and the data terminal.

16. The portable electronic device of claim 10, wherein the discharge blocking circuit is configured to turn on only responsive to a high voltage on the data terminal.

17. The portable electronic device of claim 10, wherein the discharge blocking circuit comprises a high $V_{GS}$ Field Effect Transistor (FET) between the data terminal and the positive terminal that is active only when the data terminal has a steady state voltage thereon.

18. The portable electronic device of claim 10, wherein a potential difference between the positive terminal and the negative terminal is greater than 1V due to associated anodic indices of materials used for the portable electronic device and the battery pack.

19. The portable electronic device of claim 10, wherein the battery pack is selectively insertable in the recharging source whether the battery pack is coupled or decoupled from the portable electronic device.

20. A method in a battery pack selectively coupled to a portable electronic device to inhibit corrosion with discharge blocking features, wherein the battery pack comprise a positive terminal, a negative terminal, and a data terminal accessible from a housing of the battery pack, the method comprising:
    operating a discharge blocking circuit in the battery pack, wherein the discharge blocking circuit is coupled to the data terminal and one of the positive terminal and the negative terminal;
    blocking voltage by the discharge blocking circuit across the positive terminal and the negative terminal based on no steady state pull up on the data terminal; and
    allowing voltage by the discharge blocking circuit across the positive terminal and the negative terminal based on steady state pull up on the data terminal, wherein the steady state pull up is based on the battery pack being coupled to a recharging source.

* * * * *